June 26, 1945.  A. E. WILLIAMS  2,378,964
APPARATUS FOR COOLING OR DEHUMIDIFYING AIR
Filed Aug. 1, 1942  2 Sheets-Sheet 1

INVENTOR
Allan E. Williams
BY
Popp and Popp
ATTORNEYS.

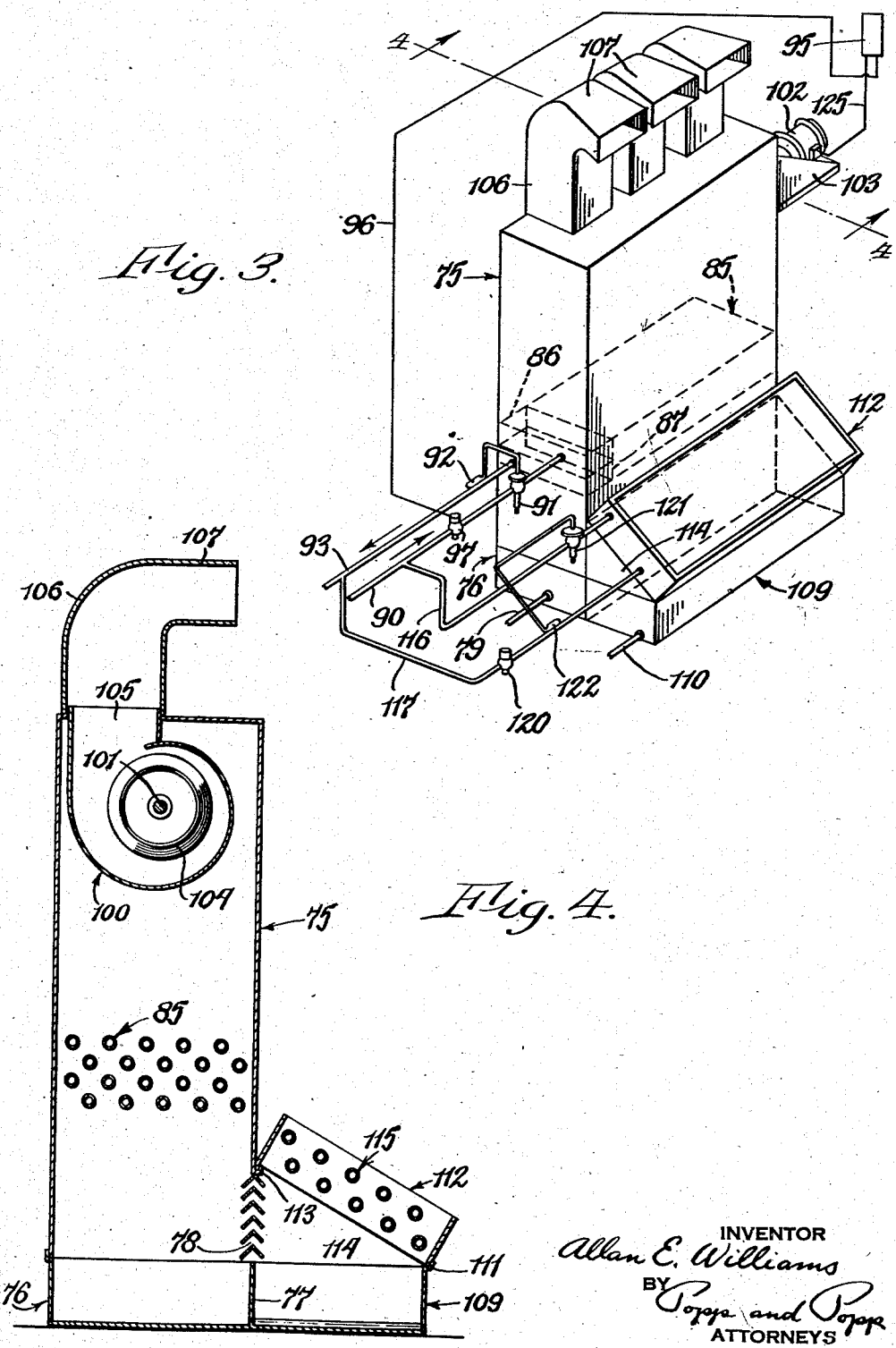

Patented June 26, 1945

2,378,964

UNITED STATES PATENT OFFICE 2,378,964

APPARATUS FOR COOLING OR DEHUMIDIFYING AIR

Allan E. Williams, White Plains, N. Y., assignor to Niagara Blower Company, New York, N. Y., a corporation of New York Application August 1, 1942, Serial No. 453,213

5 Claims. (Cl. 183—23)

This invention relates to apparatus for cooling or dehumidifying air and more particularly to apparatus in which the air is drawn over a cooling surface maintained at a temperature below the freezing point of water. The invention can be advantageously employed in such cooling apparatus which can be either of the dry cooling surface type, in which case the low temperature cooling surface tends to frost and ice up from the moisture of the air, or of the sprayed cooling surface type in which the low temperature cooling surface is sprayed with water containing an antifreeze medium and in which case the spray water is subject to dilution by water precipitated out of the air by the low temperature sprays and cooling surface.

Cooling apparatus of this character can be used wherever it is desirable to cool or dehydrate the air in an enclosure. It can be employed to cool or dehydrate fresh or recirculated air to, say, —50° F. for the purpose for supplying dehydrated air to test laboratories. It can also be employed to recirculate and cool the air in cold storage rooms and the like. In such use, a certain amount of damp, warm air enters the room or enclosure from the warm outside air by the opening of access doors and infiltration through the walls. Further, the foods or processing in the room or enclosure generally give off a certain amount of moisture to the air and the workers likewise add moisture to the air. This moisture added to the air is removed in the cooling unit, and in apparatus as heretofore constructed, the sprays or dry cooling surface have operated to condense this moisture in the air, this water thereby becoming incorporated in the spray liquid or freezing on the dry cooling surface. Since the cooling surface is maintained at a temperature below the freezing point of water, where the coils are sprayed, it is necessary to incorporate an antifreeze medium in the water used for the sprays. The antifreeze medium employed is preferably miscible with water, the higher alcohols being available for this purpose, although ordinary salt can be employed. Where moisture is condensed out of the air, the concentration of the spray water must be maintained either by additions of the antifreeze medium to the spray water or by regenerating the spray water in an evaporator. Otherwise the spray water would freeze on the cooling surfaces which maintain the low temperature of the spray water. Either method of maintaining the desired concentration of the spray water, that is, by additions of the antifreeze component or by regeneration through evaporation, involves, of course, a loss which is undesirable.

It is the principal object of the present invention to provide apparatus for cooling air and having a cooling surface maintained below the freezing point of water in which the function of this low temperature cooling surface in dehumidifying the air is reduced to a minimum thereby to reduce, to a great degree, the frosting up of the cooling surface, where a dry cooling surface is employed, and the necessity for costly additions of the antifreeze component or the regeneration of the spray water by evaporation to maintain the minimum concentration of the antifreeze component in the spray water where a sprayed cooling surface is employed. By accomplishing this purpose, with a dry low temperature cooling surface, the necessity for frequent defrosting of the cooling surface is eliminated. By accomplishing this purpose with a sprayed cooling surface there is a saving in the power of steam used in the operation of the evaporative concentrating apparatus and it is also possible to reduce the size and capacity of the concentrating apparatus required for a particular job.

Another object of this invention is to provide such apparatus which will provide added refrigeration capacity during the loading period in cold storage rooms or the like, the apparatus forming the subject of this invention providing additional cooling surface for this purpose.

Another object of the invention is to provide such apparatus in which under normal load conditions substantially all of the dehumidification of the air can be effected independently of the low temperature cooling surface. By this means, where a dry low temperature cooling surface is employed the moisture does not freeze on this surface, and where a sprayed low temperature cooling surface is employed there is no dilution of the spray water.

Another object of the invention is to provide a means for dehumidifying the air before coming in contact with the sprays which will effect a maximum dehumidification of the air and at the same time will not itself ice up and be rendered inoperative.

Another object of the invention is to provide a means for dehumidifying the air before coming in contact with the low temperature cooling surface or sprays which means under light load conditions can be used to maintain the desired temperature and relative humidity in the room, thereby permitting the low temperature cooling surface and any sprays associated therewith to be cut entirely out of operation with a consequent saving in power.

Another purpose of the invention is to provide such an apparatus which is simple in construction and which will stand up under conditions of severe and constant use without getting out of order or requiring repairs.

In the accompanying drawings:

Fig. 3 is a perspective view similar to Fig. 1 showing a modified form of the invention.

Fig. 4 is a vertical transverse sectional view, taken on line 4—4, Fig. 3.

Figures 1, 2:
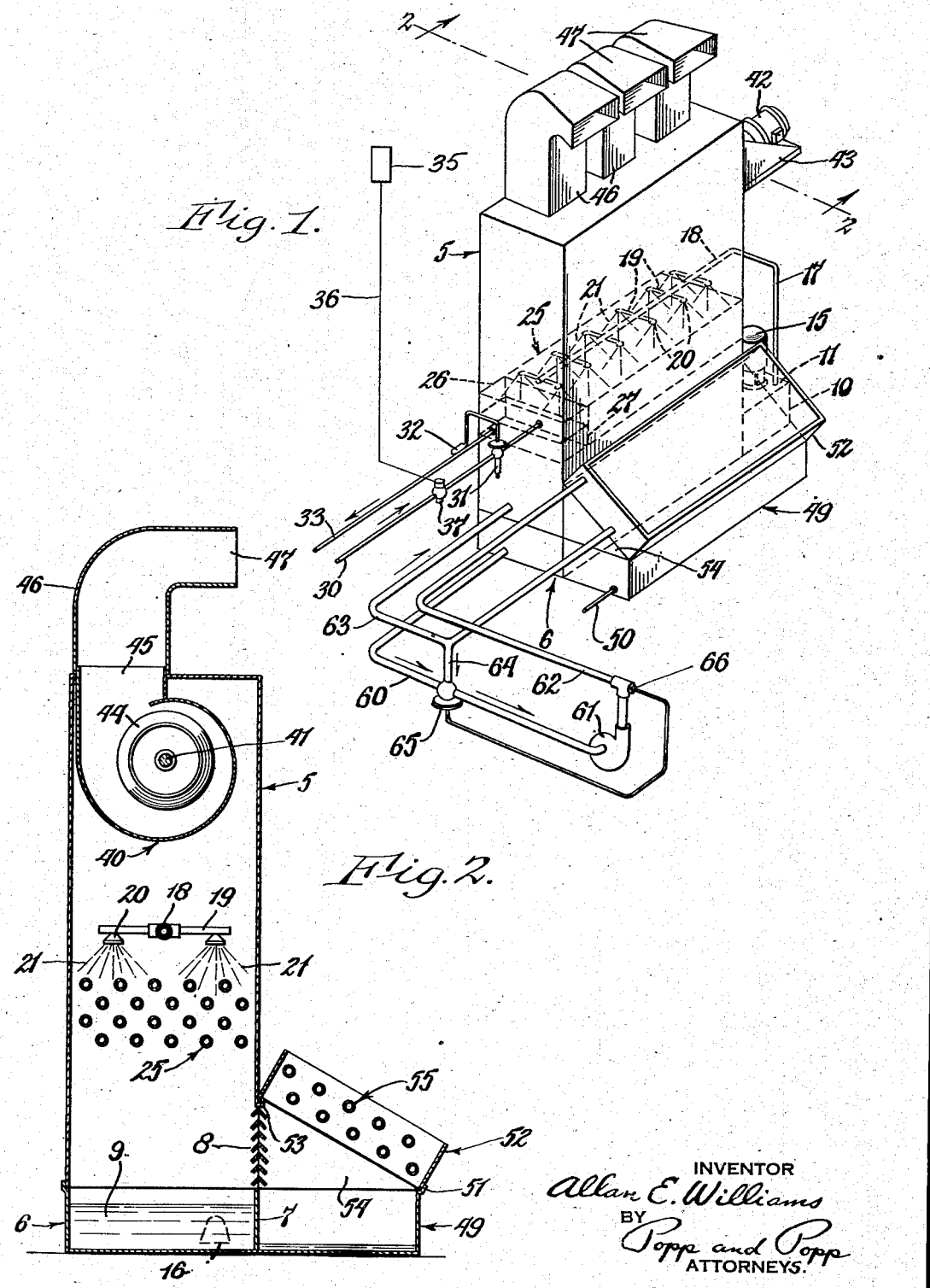
Fig. 1 is a diagrammatic perspective view of air cooling or dehumidifying apparatus embodying the present invention.
Fig. 2 is a vertical transverse sectional view, taken on line 2—2, Fig. 1.

A spray type of cooler is shown in Figs. 1 and 2, this cooler being shown as including a sheet metal casing 5 which is mounted upon a tank 6, one wall 7 of which is arranged below the air inlet 8 and forms a partition wall for another tank as hereinafter described. The tank 6 contains a body of spray water 9 which is recirculated through sprays in the air stream passing through the casing 5. For this purpose one end of the tank is shown as extended beyond one end of the casing 5, as indicated at 10, this extension being shown as provided with a top 11 which supports a motor driven pump 15. This pump draws the spray water 9 from an inlet 16 in the tank 6 and discharges this spray water through a vertical pipe 17 into a horizontal pipe 18 extending lengthwise through the interior of the casing 5. This pipe 18 carries a suitable number of branch pipes 19, each of which carries a downwardly discharging nozzle 20.

The nozzles 20 discharge sprays 21 of water against a bank of cooling coils 25, this bank of coils 25 being shown as composed of tubes connected with the usual inlet and outlet headers 26 and 27.

A refrigerating medium is passed through the bank of coils 25 so as to cool the water which is sprayed thereon by the nozzles 20 thereby to cool, and if required, to dehumidify the air passing through the casing 5. This bank of cooling coils 25 may be operated either on direct expanded refrigerant or can be flooded. The refrigerant is shown as supplied from a liquid line 30 which connects with the inlet header 26 of the bank of coils 25, the refrigerant being shown as having an expansion valve 31 under control of a thermostatic element 32, this thermostatic element 32 being associated with the refrigerant outlet or suction line 33 which is connected with the outlet header 27. The refrigerant to the bank of coils 25 is also under control of a thermostat 35 through a control line 36 leading to and controlling a solenoid valve 37 arranged in the liquid refrigerant line 30 in advance of the expansion valve 31. The sensitive parts of the thermostat 35 are arranged in the air of the enclosure so as to maintain the desired temperature of the air in this enclosure.

A plurality of fan housings 40 are shown as mounted in the upper part of the casing 5, the inlets of these fan housings being in communication with the interior of the casing 5 so as to exhaust air therefrom and draw room air through the inlet 8 and upwardly past the bank of coils 25 and the sprays 21. A common shaft 41 extends through the several fan housings 40 and is shown as driven by a motor 42 mounted on a bracket 43 at one end of the casing 5. Within each fan housing the shaft 41 carries a fan wheel 44 of any suitable construction these fan wheels drawing the air from the interior of the casing 5 and discharging it through the outlets 45 of the several fan housings. Each of the outlets 45 is shown as discharging into an outlet 46, the discharge 47 of which is shown as arranged horizontally so as to direct the cold air horizontally out into the enclosure in which the foods are stored, the apparatus being normally arranged directly in the cold storage room.

With the part of the unit as above described, the air from the enclosure to be cooled or dehumidified, or fresh air to be discharged into the enclosure is drawn through the inlet 8 and upwardly through the casing 5 past the bank of cooling coils 25 and the sprays 21 issuing from the nozzles 20. These nozzles spray the water with its antifreeze component at high velocity into the air stream and it impinges against the tubes of the coils 25. The temperature of the cooling coils 25 is maintained below the freezing point of the water, but since the spray water 9 contains an antifreeze component there is no danger of any ice formation on the tubes and frost cannot collect since the impinging high velocity streams of spray water constantly wash the tubes. The spray water is supplied to the nozzles 20 by the motor driven pump 15 which draws the spray water 7 from the tank 6 and discharges it into the pipes 17 and 18 which carry the spray nozzles.

When the temperature of the refrigerating medium used in the bank of coils 25 is below the dewpoint of the air passing through the casing 5, this air is chilled below its dewpoint on passing the tubes and sprays, and consequently moisture is precipitated from the air and mixes with the spray water solution in the tank 6 from the bottom of the casing. This dilution of the spray water will, of course, in time cause the spray water to freeze upon the bank of coils 25 and hence it is necessary to maintain a minimum concentration of the spray water under conditions of operation where the spray water is subject to dilution either by additions of antifreeze component to the dilute spray water or by regenerating the spray water through evaporation. Either method is costly and the primary object of the present invention is to reduce to a minimum the dehumidifying effect of the chilled sprays 21 and the bank of low temperature cooling coils 25 so as to reduce to a minimum the dilution of the spray water because of such dehumidifying effect.

To this end a second pan 49 having a drain 50 is arranged outside of the casing 5 immediately below its air inlet opening 8, the partition 7 under this air intake forming one side wall of this pan. The opposite wall of this pan 49 is formed to provide a lip or flange 51 which supports the lower end of an inclined rectangular frame 52, the opposite edge of this frame being supported on a lip or flange 53 formed in a casing 5 along the upper margin of the inlet opening 8. Triangular filler pieces 54 are provided on the opposite ends of the pan 49 and which fill the spaces between the ends of this pan and the ends of the frame 52 so that all air entering the air inlet 8 of the casing 5 is required to pass through the rectangular frame or casing 52.

This casing contains a bank of cooling coils 55 which is supplied with a cooling medium, this cooling medium preferably comprising the spray water 9 which has been chilled by contact with the low temperature cooling coil 25.

The primary purpose of the coil 55 is to take out as much moisture as possible from the incoming air by reducing it to a temperature of approximately 32° F. and, of course, saturated, this moisture being arranged to drip off the coil 55 into the drain pan 49 beneath this coil. This reduces the dilution of the spray water 9 which is sprayed over the cooling coil 25 and which contains an antifreeze component. The chilled spray water 9 is shown as withdrawn from the sump or tank 6 of the casing 5 through an inlet line 60 to a pump 61, the outlet line 62 of this pump connecting with the coil 55 and the other end of this coil 55 being connected by a return line 63 leading back to the body of spray water 9 contained within the tank 6. To maintain the desired minimum temperature of the cooling coil 55 at or about 32° F. a bypass pipe 64 is shown as connecting the return line 63 from the cooling coil 55 with the pump suction line 60, the amount of spray water passing through this bypass line 64 being regulated by a bypass valve 65 which is in turn actuated by a thermostat 66 which is shown as responsive to the temperature of the spray water supplied through the pump outlet line 62 to the cooling coil 55. The thermostat 66 is set to maintain the desired temperature of approximately 32° F. of the cooling coil 55. If the temperatures of the spray water 9 decrease the thermostat 66 actuates the bypass valve 65 to admit more bypassed or return spray water from the coil 55 to the pump inlet line 60. Since the return spray water from the coil 55 is relatively warm, the addition of this return spray water from the coil 55 to the inlet of the pump 61 serves to increase the temperature of the spray water supplied to the coil 55. It will be seen that by the thermostatic adjustment of the proportions of bypassed and fresh spray water supplied to the coil 55 an accurate maintenance of the temperature of this cooling coil at approximately 32° F. can be maintained. Since the cooling coil 25 is always below freezing temperature, the spray water 9 is similarly below 32° F. and can be used to maintain this temperature in the precooling coil 55. The moisture condensed out of the air by the primary or precooling coil 55 drips into the pan 49 and is wasted through the line 50.

In Figs. 3 and 4 the invention is shown as embodied in an air cooler of the dry surface type, although it will be understood that the low temperature coils of this form of the invention could be sprayed with recirculated spray water in the same manner as in the form of the invention shown in Figs. 1 and 2. In the form of the invention shown in Figs. 3 and 4 the cooler is shown as including a sheet metal casing 75 which is mounted upon a tank 76, one wall 77 of which is arranged below the air inlet 78 and forms a partition wall for another tank as hereinafter described. The tank 76 is adapted to collect water which accumulates during defrosting or deicing periods and is shown as provided with a drain 79. The casing 75 houses a bank of cooling coils 85, this bank of cooling coils 85 being shown as composed of tubes connecting with the usual inlet and outlet headers 86 and 87.

A refrigerating medium is passed through the bank of cooling coils 85 so as to maintain these coils at a temperature below the freezing point of water and to cool, and if required, dehumidify the air passing through the casing 75. This bank of cooling coils 85 may be operated either on direct expanded refrigerant or can be flooded. The refrigerant is shown as supplied from a liquid line 90 which connects with the inlet header 86 of the bank of coils 85, the refrigerant being shown as having an expansion valve 91 under control of a thermostatic element 92, this thermostatic element 92 being associated with a refrigerant outlet or suction line 93 which is connected with the outlet header 87. The refrigerant to the bank of coils 85 is also under control of a thermostat 95 through a control line 96 leading to and controlling a solenoid valve 97 arranged in the liquid refrigerant line 90 in advance of the expansion valve 91. The sensitive parts of the thermostat 95 are arranged in the air of the enclosure so as to maintain the desired temperature of the air in this enclosure. As with the form of the invention shown in Figs. 1 and 2, a plurality of fan housings 100 are shown as mounted in the upper part of the casing 75, the inlets of these fan housings being in communication with the interior of the casing 75 so as to exhaust air therefrom and to draw room air through the inlet 78 and upwardly past the bank of coils 85. A common shaft 101 extends through the several fan housings 100 and is shown as driven by a motor 102 mounted on a bracket 103 at one end of the casing 75. Within each fan housing the shaft 101 carries a fan wheel 104 of any suitable construction, these fan wheels drawing the air from the interior of the casing 75 and discharging it through the outlets 105 of the several fan housings. Each of the outlets 105 is shown as discharging into an outlet 106, the discharge 107 of which is shown as arranged horizontally so as to direct the cold air horizontally out into the enclosure to be cooled or dehumidified, the apparatus being normally arranged directly in the enclosure. With the part of the unit as above described fresh air or the return air from the enclosure to be cooled or dehumidified is drawn through the inlet 78 and upwardly through the casing 75, past the bank of cooling coils 85, this air, after being chilled by the low temperature coils 85, being discharged into the enclosure through the outlets 107.

When the temperature of the refrigerating medium used in the bank of coils 85 is below the dewpoint of the air passing through the casing 75 this air is chilled below its dewpoint on passing the tubes and consequently moisture is precipitated from the air and freezes upon the tubes of the coil 85. This ice accumulates until a point is reached where the heat transfer efficiency of the tubes is materially decreased and it is necessary to shut down the apparatus to permit this ice to melt or to otherwise defrost the tubes of the coil 85. As with the form of the invention shown in Figs. 1 and 2 the primary object of the present invention is to reduce to a minimum the dehumidifying effect of the low temperature cooling coil 85 so as to reduce the tendency of these low temperature cooling coils to accumulate ice and thereby lose efficiency and reduce to a minimum the necessity of frequent defrosting periods.

To this end, as with the form of the invention shown in Figs. 1 and 2, a second pan 109 having a drain 110 is arranged outside of the casing 75 immediately below its air inlet opening 78, the partition 77 under this air intake forming one side wall of this pan. The opposite wall of this pan 109 is formed to provide a lip or flange 111 which supports the lower end of an inclined rectangular frame 112, the opposite edge of this frame being supported on a lip or flange 113 formed in the casing 75 along the upper margin of the inlet opening 78. Triangular filler pieces 114 are provided at the opposite ends of the pan 109 and which fill the spaces between the ends of this pan and the ends of the frame 112 so that all air entering the air inlet 78 of the casing 75 is required to pass through the rectangular frame or casing 112.

The casing contains a bank of cooling coils 115 which is supplied with refrigerant from the supply line 90 through a branch line 116, the refrigerant from the bank of coils 115 returning through a branch 117 to the suction or refrigerant return line 93.

As with the form of the invention shown in Figs. 1 and 2, the primary purpose of the coil 115 is to take out as much moisture as possible from the incoming air by reducing it to a temperature of approximately 32° F. and, of course, saturated, this moisture being arranged to drip off the coil 115 into the drain pan 109 beneath this coil. This reduces the rapidity of the accumulation of ice on the low temperature secondary cooling coil 85. To maintain the desired minimum temperature of the cooling coil 115 at or about 32° F. an automatic back pressure valve 120 is provided in the return branch line 117 from the cooling coil 115, this back pressure valve controlling the surface temperature of the cooling coil 115. As with the low temperature cooling coil 85, an expansion valve 121 is provided in the branch refrigerant supply line 116 to the primary cooling coil 115, this expansion valve being under control of a thermostat element 122 responsive to the temperature of the refrigerant leaving the primary cooling coil 115. The moisture condensed out of the air by the primary cooling coil 115 drips into the pan 109 and is wasted through the line 110.

The room thermostat 95 is also connected by a line 125 with the fan motor 102 so as to control the operation of the fan wheels 104. This thermostat 125 is stepped in its action so that when the temperature of the air in the enclosure drops toward that which is to be maintained it first acts through its control line 96 to close the solenoid valve 97 in the liquid refrigerant supply line 90 to the secondary cooling coils 85. Under this condition of operation the entire cooling of the air drawn through the unit is effected by the dry primary coil 115 and hence any moisture precipitated out of this air is caught in the pan 109. When, through a further drop in the room temperature, the room temperature reaches that which the apparatus is set to maintain, the thermostat 95, through its control line 125, deenergizes the fan motor 102 and renders the apparatus inoperative until a further demand is made upon it by reason of a rising room temperature. On such rising room temperature the thermostat 95 energizes the fan motor 102 so as to draw air through the primary coil 115 and discharge this air back into the enclosure. Since at this time no refrigerant is supplied to the secondary cooling coil 85, all of the cooling is effected by the primary cooling coil 115 and any moisture precipitated out of this air is caught by the drain pan 109.

As the temperature continues to rise, the thermostat 95 opens the solenoid valve 97 so as to admit liquid refrigerant to the secondary cooling coil 85, thereby to place this cooling coil in operation under normal load conditions. With the conjoint action of the two cooling coils, the greater part of the moisture precipitated from the air is precipitated by the primary cooling coil 115 and this condensate is separately wasted so as not to freeze upon the low temperature cooling coil 85.

As previously stated, sprays can be incorporated in the apparatus shown in Figs. 3 and 4 in the same manner as shown in Figs. 1 and 2, although where spray water is available it is advantageous to use this spray water in the primary cooling coil.

From the foregoing it will be seen that the present invention provides an apparatus for cooling or dehumidifying an enclosure which can be of either the dry coil or spray cooler type and in which the greater part of the excess moisture in the air to be treated is removed by a primary coil maintained at 32° F. to operate with the greatest efficiency without danger of freezing. By the use of such a coil, which can be supplied either with a direct expanded refrigerant or with the spray water brought in contact with the low temperature coil, there is a substantial reduction in icing up of the low temperature coils, in a dry coil type of cooler, and dilution of the spray water, in a spray type of cooler. Further, it will be seen that under light load conditions the entire cooling work of the apparatus can be effected by the dry primary cooling coil and that the addition of such a dry primary cooling coil increases the capacity of the cooler and its ability to respond to heavy loads.

I claim as my invention:

1. Apparatus of the character described for cooling or dehumidifying the air in an enclosure, comprising a casing having an air inlet and an air outlet, said air outlet discharging into said enclosure, a fan for effecting movement of a stream of air from said air inlet through said casing and through said air outlet into said enclosure, an electric motor driving said fan, a primary cooling coil arranged adjacent said air inlet and over which said stream of air first passes, means for maintaining said primary cooling coil at a temperature to precool the air passing thereover to a temperature above and near to the freezing point of water thereby to precipitate moisture out of said stream of air in liquid form, a secondary cooling coil in said casing and through which said stream of air passes after leaving said primary cooling coil, means for passing a cooling medium through said secondary cooling coil to maintain said secondary cooling coil at a temperature below the freezing point of water, a thermostat responsive to the temperature of the air in said enclosure, means for controlling the temperature of said secondary cooling coil, means operatively connecting said thermostat with said last means and with said fan motor to first cut off the flow of said cooling medium through said secondary cooling coil and then to deenergize said fan motor as the temperature of said enclosure falls to that which said thermostat is set to maintain and to first energize said fan motor and thereafter admit said cooling medium to said secondary cooling coil on a subsequent rise in temperature in said enclosure, and means for separately collecting the moisture precipitated out of said stream of air by said primary cooling coil.

2. Apparatus of the character described for cooling or dehumidifying the air in an enclosure, comprising a casing having bottom, side and top walls and having an air inlet near its bottom and an air outlet at its top, said inlet and outlet communicating with said enclosure, said casing providing a pan in its bottom below said air inlet for collecting spray water, a fan in the upper part of said casing for moving a stream of the air to be treated at substantially atmospheric pressure in through said air inlet, up through said casing and out through said air outlet, a dry primary cooling coil arranged outside of said casing adjacent said air inlet and through which the air entering said air inlet is required to pass, means maintaining said primary cooling coil at a temperature to precool the air passing therethrough to a temperature above and near to the freezing point of water thereby to precipitate moisture out of said stream of air in liquid form before entering said casing, a secondary cooling coil in said casing through which said stream of air flowing upwardly through said casing is required to pass, means maintaining said secondary coil at a temperature below the freezing point of water, means spraying water containing an antifreeze component to impinge against said secondary cooling coil to increase the heat transfer between said secondary cooling coil and said stream of air and to adjust the relative humidity of said stream of air, said spray water collecting in said pan, means recirculating the collected spray water from said pan to said spraying means, a drain pan arranged outside of said casing and below said primary coil and below said air inlet for separately collecting the moisture precipitated out of said air by said primary coil, and eliminator plates across said air inlet and removing entrained water so precipitated by the passage of the air through said primary cooling coil.

3. Apparatus of the character described for cooling the air in an enclosure, comprising a casing having bottom, side and top walls and having an air inlet near its bottom and an air outlet at its top, said inlet and outlet communicating with said enclosure, a fan in the upper part of said casing for moving a stream of the air to be treated at substantially atmospheric pressure in through said air inlet, through said casing and out through said air outlet, a dry primary cooling coil arranged outside of said casing adjacent said air inlet and through which the air entering said air inlet is required to pass, means maintaining said primary cooling coil at a temperature to precool the air passing therethrough above and near to the freezing point of water thereby to precipitate moisture out of said stream of air in liquid form before entering said casing, a secondary cooling coil in said casing through which said stream of air flowing upwardly through said casing is required to pass, means maintaining said secondary coil at a temperature below the freezing point of water, a drain pan arranged outside of said casing and below said primary coil and below said air inlet for separately collecting the moisture precipitated out of said air by said primary coil, and eliminator plates across said air inlet and removing entrained water so precipitated by the passage of the air through said primary cooling coil.

4. Apparatus of the character described for cooling or dehumidifying the air in an enclosure, comprising a casing having bottom, top and side walls and having an air inlet at one end and an air outlet at its opposite end, said inlet and outlet communicating with said enclosure, a fan arranged in said casing in said opposite end thereof and moving a stream of air to be treated at substantially atmospheric pressure in through said air inlet, through said casing and out through said air outlet, a dry primary cooling coil arranged adjacent said air inlet and through which the air entering said air inlet is required to pass, means maintaining said primary cooling coil at a temperature to precool the air passing therethrough to a temperature above and near to the freezing point of water thereby to precipitate moisture out of said stream of air in liquid form on entering said casing, a secondary cooling coil in said casing through which said stream of air flowing through said casing is required to pass, means maintaining said secondary coil at a temperature below the freezing point of water, means spraying water containing an antifreeze component to impinge against said secondary cooling coil to increase the heat transfer between said secondary cooling coil and said stream of air and to adjust the relative humidity of said stream of air, said casing being formed below said secondary cooling coil to provide a pan collecting said spray water, means recirculating the collected spray water from said pan to said spraying means, a drain pan arranged below said primary cooling coil for separately collecting the moisture precipitated out of said air by said primary cooling coil, and eliminator plates between said primary and secondary cooling coils and removing entrained water so precipitated by the passage of the air through said primary cooling coil.

5. Apparatus of the character described for cooling or dehumidifying the air in an enclosure, comprising a casing having bottom, top and side walls and having an air inlet at one end and an air outlet at its opposite end, said inlet and outlet communicating with said enclosure, a fan arranged in said casing in said opposite end thereof, and moving a stream of air to be treated at substantially atmospheric pressure in through said air inlet, through said casing and out through said air outlet, a dry primary cooling coil arranged adjacent said air inlet and through which the air entering said air inlet is required to pass, means maintaining said primary cooling coil at a temperature to precool the air passing therethrough to a temperature above and near to the freezing point of water thereby to precipitate moisture out of said stream of air in liquid form on entering said casing, a secondary cooling coil in said casing through which said stream of air flowing through said casing is required to pass, means maintaining said secondary coil at a temperature below the freezing point of water, a drain pan arranged below said primary cooling coil for separately collecting the moisture precipitated out of said air by said primary cooling coil, and eliminator plates between said primary and secondary cooling coils and removing entrained water so precipitated by the passage of the air through said primary cooling coil.

ALLAN E. WILLIAMS.